United States Patent [19]

Showalter

[11] Patent Number: 4,470,375

[45] Date of Patent: Sep. 11, 1984

[54] FULLY HYDRODYNAMIC PISTON RING AND PISTON ASSEMBLY WITH ELASTOMERICALLY CONFORMING GEOMETRY AND INTERNAL COOLING

[75] Inventor: Merle R. Showalter, Madison, Wis.

[73] Assignee: Automotive Engine Associates, Madison, Wis.

[21] Appl. No.: 502,579

[22] Filed: Jun. 9, 1983

[51] Int. Cl.³ .............................. F02F 3/18; F02F 5/00
[52] U.S. Cl. .................................. 123/41.35; 92/158;
92/208; 123/193 P; 277/216; 165/41
[58] Field of Search .......... 123/41.35, 193 P, 193 CP;
92/158, 160, 177, 186, 208; 277/216, 217, 218,
219; 165/41, 51

[56] References Cited

U.S. PATENT DOCUMENTS

| | | | |
|---|---|---|---|
| 2,845,917 | 8/1958 | Laubender | 123/193 P |
| 3,545,341 | 12/1970 | Fischer | 92/186 |
| 3,727,927 | 4/1973 | Packard | 277/216 |
| 3,906,923 | 9/1975 | Harker | 123/193 CP |
| 4,178,899 | 12/1979 | Julich | 123/193 P |
| 4,318,386 | 3/1982 | Showalter et al. | 123/549 |
| 4,359,973 | 11/1982 | Shimada | 123/41.35 |
| 4,362,136 | 12/1982 | Lipp | 123/193 P |

Primary Examiner—William A. Cuchlinski, Jr.
Attorney, Agent, or Firm—Witherspoon & Hargest

[57] ABSTRACT

A piston ring and piston assembly designed for operation with the piston skirt fully flooded with oil and with the piston rings operating as fully hydrodynamic sliders is disclosed. Geometries of rings and piston skirt are arranged to conform elastically to the real out-of-round deformations of cylinder walls in such a fashion as to maximize the advantages of full film lubrication physics. The rings are loaded in circumferential compression and are flexible. This elastic configuration makes the rings conform instantaneously to cylinder wall out-of-round to a scale of microinches. This conformability is required to maintain oil control (zero oil pumping to the top of the cylinder wall) with fully hydrodynamic conditions between the rings and the cylinder wall. The piston has a piston skirt which is flexible enough to conform to cylinder wall out-of-round and maximize squeeze film effects. The piston skirt is arranged to superimpose squeeze film and pivoted pad slider physics. The piston is equipped with a heat piped internal heat transfer structure which maintains the piston in a near isothermal condition. The piston skirts are nearly isothermal. This controls expansion for improved hydrodynamic geometry. The great majority of heat transfer from the piston crown to the cylinder passes through the piston skirt oil film to the cylinder wall. The assembly utilizes component deformations to maximize hydrodynamic and squeeze film lubrication effects to minimize engine friction and wear.

15 Claims, 11 Drawing Figures

$$W = \frac{f_1\left[\dfrac{h_i}{h_o}, P_{IN}\right] \mu\, VR}{h_o} \qquad h_o = \frac{f_1\left[\dfrac{h_i}{h_o}, P_{IN}\right] \mu\, VR}{W}$$

R = CROWN RADIUS
$P_{IN}$ = VAPOR PRESS. OF AIR IN OIL AT $h_i$
$\mu$ = OIL VISCOSITY
W = FORCE ON CROWN
V = SLIDING VELOCITY
$h_i$ = INITIAL FILM THICKNESS
$h_o$ = MINIMUM FILM THICKNESS
$h_s$ = SEPARATION FILM THICKNESS

FULLY HYDRODYNAMIC PISTON RING AND PISTON ASSEMBLY WITH ELASTOMERICALLY CONFORMING GEOMETRY AND INTERNAL COOLING

BACKGROUND AND OBJECTS

Current piston ring and piston assemblies in internal combustion engines have very high friction. There are substantial fuel economy gains available if it is possible to reduce this operating friction. Calculation indicates that piston ring and piston assembly friction would be available if the piston rings and pistons functioned as optimally designed bearings. Current ring and piston assemblies operate with very thin oil films, largely because the ring assemblies function with oil scrapers which scrape the oil layer on the cylinder wall down to extremely thin values. This results in very high ring friction and high piston skirt friction. Moreover, the pistons which have evolved over time are not designed to utilize the squeeze film and hydrodynamic lubrication effects efficiently. This is partly because of the scraping of the cylinder wall oil layer from the rings, and also partly because of problems with differential expansion of various areas of the piston.

It is worthwhile to review the fundamentals required for design of a low friction piston ring and piston assembly. The friction that occurs between parts separated by a full oil film is much lower than the friction that occurs in boundary lubrication. Since the film friction for a full film is inverse with film thickness, there is a strong incentive to produce the thickest possible oil films between sliding parts.

It is well documented in the literature that convergent wedge-shaped films generate significant pressures. The equation for oil wedges in Reynold's equation, which is explained thoroughly in a number of textbooks and references (i.e. Chapter 3, page 3-4 in *Standard Handbook of Lubrication Engineering*, O'Connor and Boyd, McGraw-Hill, New York, 1968). The application of Reynold's equation is well understood in cases that involve fully convergent wedges. In cases involving geometries with both convergent and divergent sections, Reynold's equation is easy to apply for heavily loaded cases. Hydrodynamic lubrication has been exhaustively treated in the literature. It is an area of mechanical engineering where exact mathematical equations are known to work within any reasonable experimental error.

In the engine context, an additional important load bearing potential exists because of the cyclical nature of the loads. If two surfaces are separated by an oil layer and a force is applied pushing the surfaces together, the oil layer which must be squeezed out between the surfaces generates a force which resists the approach of the surfaces. This is the squeeze film effect. In a piston, the load on the skirts fully reverses during every cycle so that it is possible to take advantage of squeeze film effects if the piston skirts are supplied with enough oil. The magnitude of the squeeze film effect varies greatly with changes in the geometry of the approaching surfaces. The geometric effects are exactly calculable for simple cases (and always calcuable using the calculus if geometry and viscosity are known). A sense of the critical nature of the squeeze film effect can be achieved by looking at the equations for the squeeze film effect for planar surfaces. For planar surfaces approaching each other, the formulas for resistance force W and time to collapse a set distance under a set load delta T have the general formulas:

$$W = -\frac{k_1 \mu D^4}{h^3} \frac{dh}{dt} \text{ and } t = \frac{k_2 \mu D^4}{W}\left(\frac{1}{(h_2)^2} - \frac{1}{(h_1)^2}\right)$$

(where $\mu$ is viscosity, W is resisting force, $\Delta t$ is time to collapse film from distance $h_2$ to $h_1$, $k_1$ and $k_2$ are geometrical coefficients, h is film thickness, $h_2$ is film thickness at $t_2$ and $h_1$ is film thickness at $t_1$.). For cylindrical surfaces approaching each other, squeeze film force W and time to collapse a set distance under a set load are similarly dependant on the match of radius of curvature of the two surfaces.

The convergent angles and geometrical relations of hydrodynamic film physics involve critical geometrical issues. The heavy loads occuring in engines invariably deform the parts in a way which affects the film forming geometry and the friction. The film thicknesses and geometrical relations often required for optimal fullfilm physics require geometrical precision not reasonably obtainable in production. Moreover, heavy loads produce deformations such that the oil film forming geometry varies from the geometries which would occur if the engine parts were infinitely stiff. Differential expansion of parts also alters film forming geometry. It is a purpose of the present invention to present designs of piston rings and pistons where the parts are shaped and cooled so that elastic deformations automatically adjust geometry to maximize oil film stability and minimize friction, even in the presence of the deformation and geometrical imperfections encountered in real engines. Optimization of flexibility of the rings and the piston skirts permits fine scale adjustment of film forming geometry which is impossible with production tolerances alone, particularly when differential expansion of parts is considered.

The piston assembly consists of an internal heat piped cooling arrangement which makes the piston effectively isothermal (and particularly makes the skirts isothermal) to permit optimization of geometry. The piston skirts are designed to be flexible with respect to circumferential out-of-round of the cylinder wall and to maximize squeeze film effects. These skirts are shaped with centrally pivoted pivoted pad slider surfaces pivoting on the wrist pin to produce the low friction high load bearing characteristics of pivoted pad sliders. On both the top and bottom sections of the piston skirt, a barrel section at large radius is provided to act as a sled runner and to catch piston rock in squeeze film mode. The barrel sections assure optimal pivoting of the piston skirt. Heat transfer from the piston crown via the heat piped section occurs through the piston skirt surfaces, where conductance through the oil film transfers the heat to the cylinder walls.

The rings are flexible piston rings mounted in circumferential compression with end-gap springs, and are arranged to conform to out-of-round of the cylinder. Ring conformance is sufficiently rapid to accommodate variations in cylinder out-of-round as the piston moves axially. The ring pack is arranged with several rings engaging the cylinder wall in a manner which uses cylinder on flat plate fluid mechanics, which has been well documented. The arrangement of spring forces, gas actuating forces, and radii of curvature produce a situation where the bottom ring, called the oil control ring, is always fully flooded and the other rings are operated in a partially starved but fully hydrodynamic condition. The rings should have essentially zero wear, and are characterized by extremely low friction. The ring assembly does not have any conventional scraper, and functions in a manner permitting fully flooded lubrication of the piston skirts. In the place in the piston where an oil scraper might ordinarily be is a groove functioning as an oil reservoir to assure that the piston skirt is fully flooded and the ring pack is maintained in the full film lubrication regime.

DETAILED DISCUSSION

Figure 1:
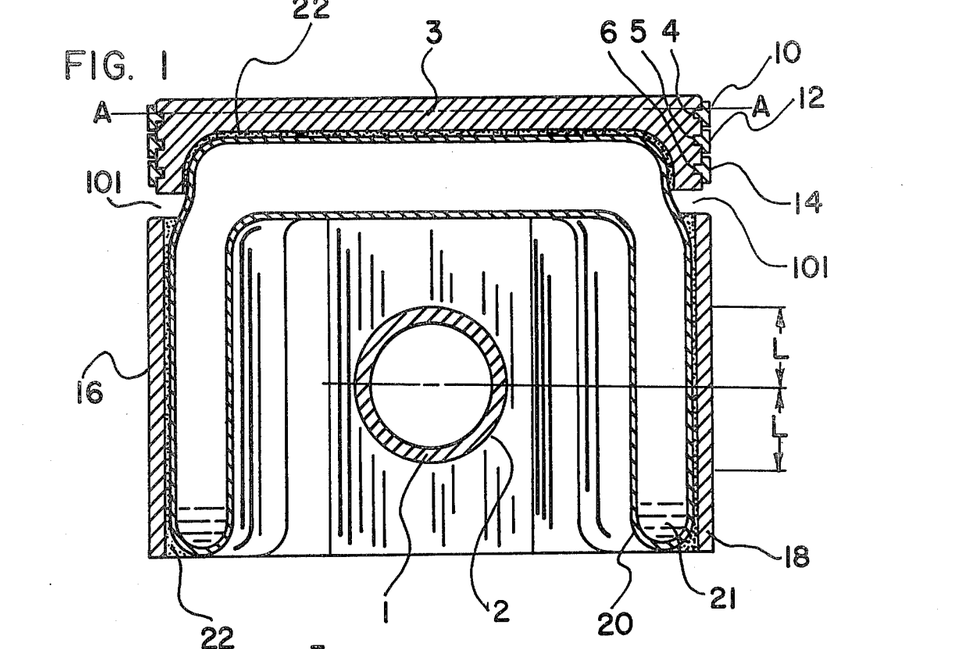
FIG. 1 shows a central sectional view perpendicular to the wrist pin showing the heat pipe, piston skirts and a cross sectional view of the flexible piston rings.

FIG. 1 is a central sectional view perpendicular to the wrist pin showing the heat pipe, piston skirts and a cross section of the flexible piston rings. Wrist pin 1 rides in wrist pin boss 2 which is integrally connected to piston crown 3. On the sides of the piston crown are circumferential grooves 4, 5 and 6 in which are mounted circumferentially loaded flexible and hydrodynamic piston rings 10, 12 and 14. Rings 10 and 12 have a preferred cylindrical crown of the order of two (2) inches (50.8 mm). Since such a crown would be indistinguishable from a line in the drawing, the crown is shown exaggerated for clarity. Ring 14, which functions to ration oil flow to the rings 10 and 12, has a cylindrical crown radius of curvature which is substantially less than the crown radius of rings 10 and 12 (for example, ¼ inch).

Piston skirts 16 and 18 are designed to be flexible and to function as centrally pivoted pivoted pad sliders with upper and lower "sled runner" barrel-shaped sections. Piston skirt 16 has a cylindrical shape centered and extending a distance L above and below the wrist pin center. Skirt 18 is shaped correspondingly. Above and below distance L, the piston skirts are slightly barrel-shaped (on a radius of curvature of approximately 20 inches or more) to form clearly convergent sled runner sections and accommodate piston rock. The flexibility of the piston skirts will be illustrated later, but it can be emphasized now that the piston skirts function as centrally pivoted pivoted pad sliders operating in a combined squeeze film and pivoted pad slider mode as the piston reciprocates. The piston skirts are flexible enough to conform to cylinder wall distortions and variations caused by thermal expansion to optimize film stability and minimize friction. Inside the piston assembly is heat piped assembly 20, which forms a high conductance thermal connection between piston crown 3 and skirts 16 and 18. Heat piped assembly 20 consists of an evacuated metallic passage with about 2–3% of its internal volume filled with working fluid 21, which transfers heat by evaporation and condensation at low pressures as the piston operates. Heat piped assembly 20 is adhesively bonded to piston crown 3 and skirts 16 and 18 with high thermal conductance (metal-filled) silicone rubber or like material 22. The function of heat pipe 20 is to hold the piston assembly nearly isothermal, and substantially reduce the heat transfer across the oil film of the hydrodynamic rings so as to maximize the viscosity of oil on which the piston rings ride. Holding the piston isothermal maintains critical geometrical relations which would otherwise be lost with differential expansion of the piston. This is necessary to minimize piston skirt friction.

Figure 2:
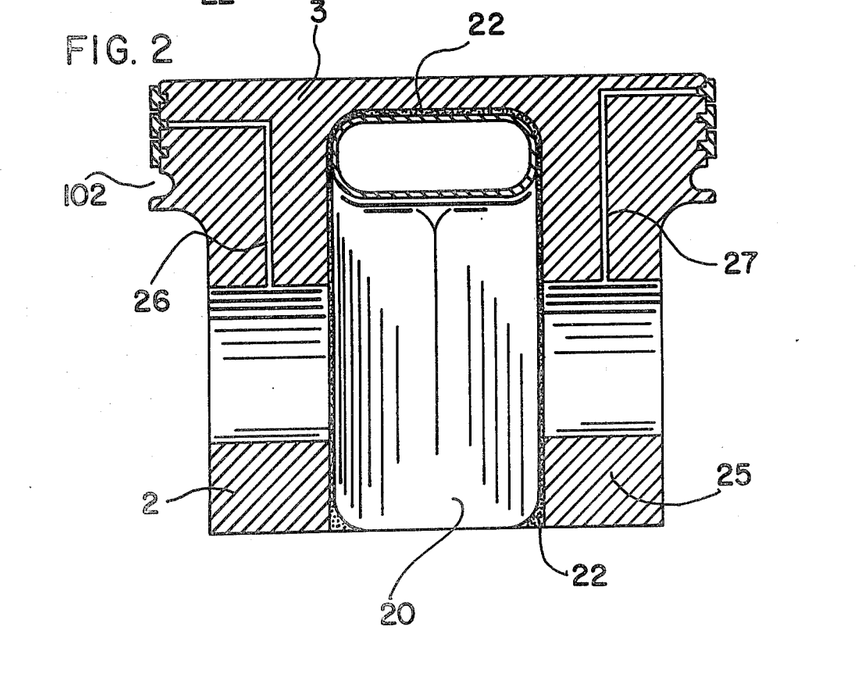
FIG. 2 is a central sectional view parallel to the wrist pin showing another view of the heat pipe 20, showing the geometry of the oil reservoir groove in the wrist pin boss area and showing a means of supplying some oil to the piston ring grooves.

FIG. 2 is a central sectional view parallel to wrist pin 1 showing another view of heat pipe 20 and showing the geometry of oil reservoir groove 102 and showing a means of maintaining some oil in the piston ring grooves to float the rings so that they can conform elastically to cylinder wall distortions and maintain oil control as required. In the journal bearing geometry of piston boss 2 and in its corresponding piston boss 25 are oil feed holes 26 and 27 which feed oil into the piston ring grooves 4 and 5. It may be necessary to provide small ring-groove vents to the crankcase to prevent excessive oil supply to the ring grooves, and these will be illustrated later. As the piston reciprocates, the fluctuating forces on the wrist pin generate strong fluctuating pressures in squeeze film mode in the wrist pin journal bearing area. These are useful to pump a very small supply of oil to the ring grooves. This oil supply is necessary so that the groove engaging portions of the rings can interact in squeeze film mode with grooves 4, 5 and 6. The full oil film produced in this way eliminates static friction between piston grooves and the groove-engaging surfaces of the rings. This allows the rings freedom of radial motion.

Also with respect to FIG. 2, it can be seen that the heat pipe geometry need not contact the entire piston skirt, since the portions of the piston skirts not in contact with the heat pipe can transfer heat by conduction.

Figure 3:
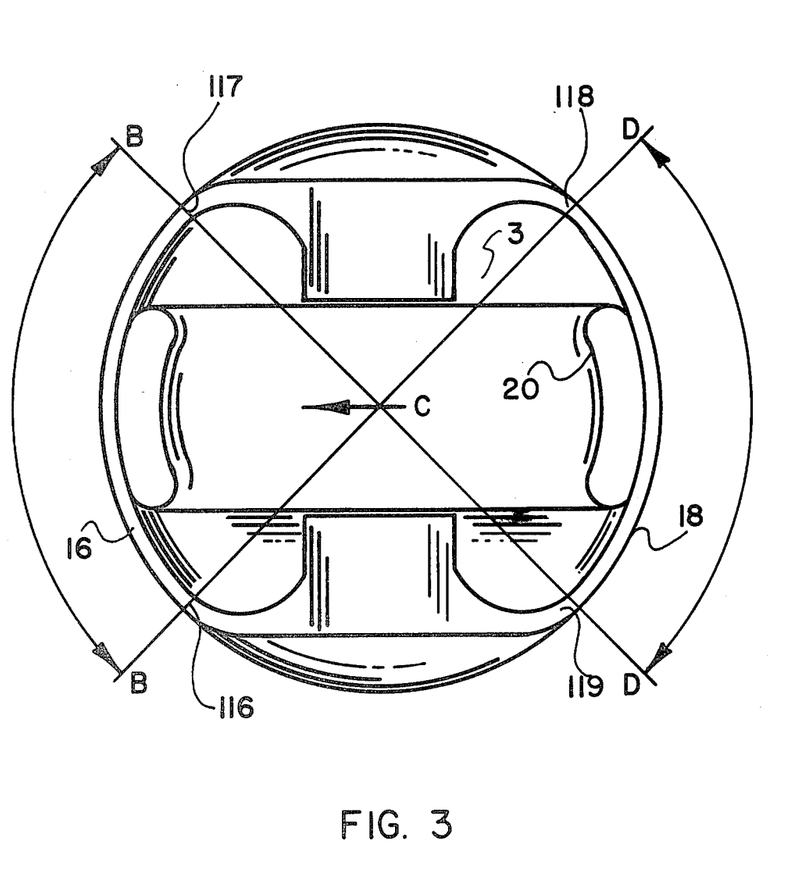
FIG. 3 is a bottom view of the piston showing the flexible skirts and the heat pipe.

FIG. 3 is a bottom view of the piston showing the flexible piston skirts 16 and 18 and the heat pipe 20. The heat pipe 20 is extremely flexible. Its stiffness is negligible with respect to total piston skirt stiffness. The cutaway notch illustrated in 101 of FIG. 1 extends around arc B—B and arc D—D of FIG. 3 so that the skirts 16 and 18 are elastically decoupled from the piston crown. The piston skirts 16 and 18 are thin, and are structurally connected to the wrist pin bosses so that they are stiffly constrained at edges 116, 117, 118 and 119. In operation of the piston, the radius of curvature of the piston skirts in the undeformed state will always be less than that of the cylinder wall. There will always be room for the piston to move from side to side as the connecting rod moves and produces side loads on one skirt and then the other skirt.

Consider a condition when piston skirt 16 is loaded with a force on the wrist pin in the direction C. The piston skirt surface will engage the cylinder wall in squeeze film mode, with the initial forces approximately centered circumferentially on the piston skirt. The skirt will deform to moderate the forces on itself. As the skirt conforms to the applied forces, the radius of curvature of the skirt will change. The change in radius of curvature of the skirt to conform to the applied loads and maximize squeeze film forces is of the order of 0.003 times cylinder radius of curvature or less. With respect to distortions of this magnitude the skirts are very flexible, and will bear their load primarily in circumferential compression.

The structural characteristics of the piston skirt under load will be discussed with respect to FIG. 6, but essentially the skirts will conform until the radial force between skirt surface and cylinder wall is nearly constant circumferentially. This flexibility is exactly what is required to maximize both squeeze film and pivoted pad slider bearing effectiveness of the piston skirts. The piston skirts are operated at all times in a flooded condition, where squeeze film fluid mechanical effects are important. It is expected that the friction between the piston skirts and the cylinder walls will always be in the fully hydrodynamic mode with correspondingly low friction.

Figure 4:
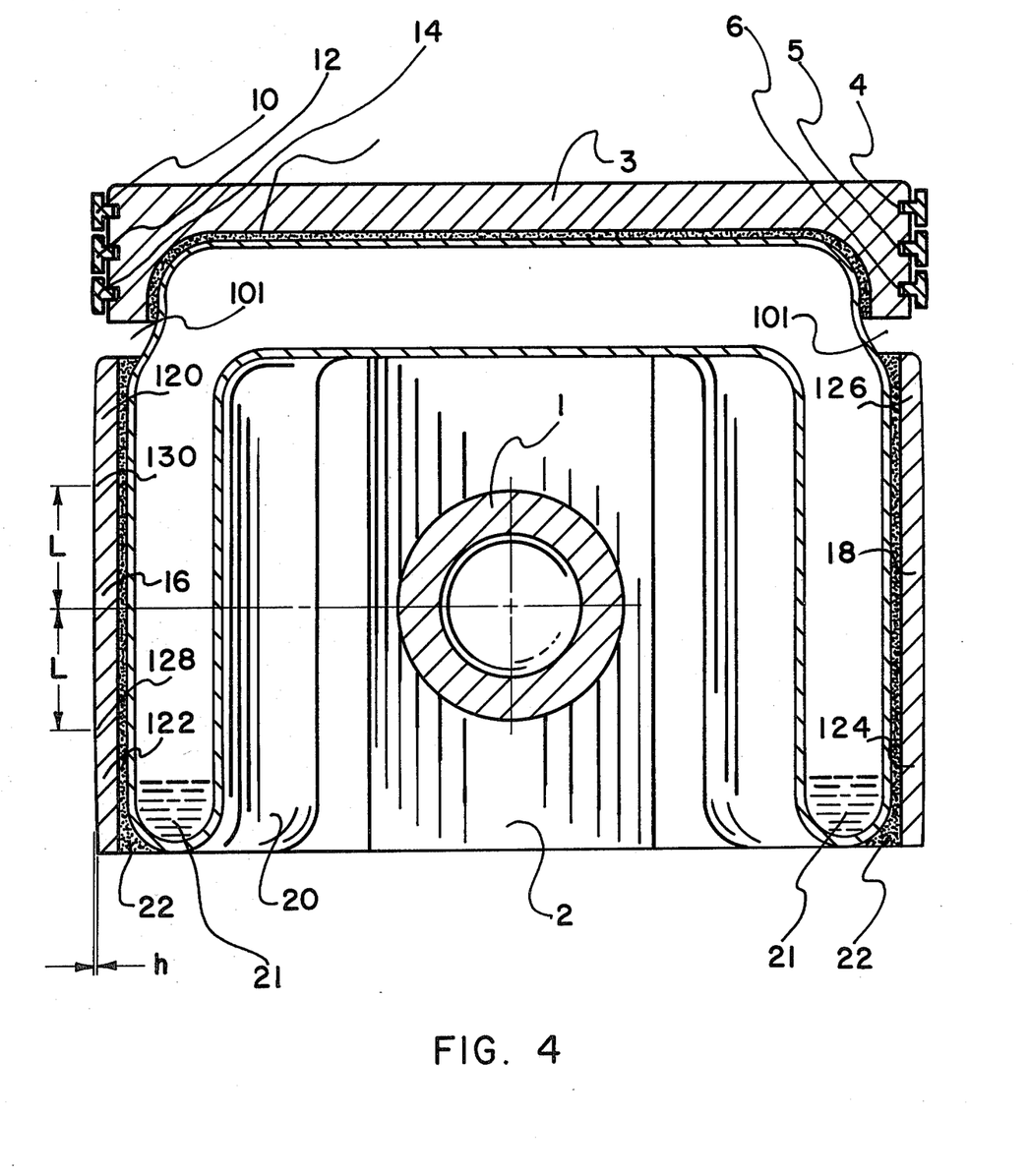
FIG. 4 is a central sectional view of the piston showing in exaggerated form the "sled runner" or barrel section geometry of the skirts.

FIG. 4 is a central sectional view of the piston showing in exaggerated form the skirt geometry. The skirts 16 and 18 have flat central sections and upper and lower barrel sections and form a centrally pivoted pad slider bearing with the wrist pin forming the pivot. The barrel shaped sections interact with the oil film in the manner of sled runners. Skirts 16 and 18 have central cylindrical sections centered a length L above and below the wrist pin center. Above and below the cylindrical surfaces are slightly barrel shaped surfaces 120, 122, 124 and 126. With respect to the geometry between 128 and 130, the skirts act as pivoted pad sliders centrally pivoted on the wrist pin. Since there will be pressure build up and no cavitation in the convergent section barrel contour, and cavitation and much less pressure build up on the divergent section barrel contour as the skirt slides, the effect of the barrel sections of the piston skirts is to assure proper pivoting of the skirts in sliding at all times.

The barrel sections have another purpose. Specifically, as the crankshaft connecting rod piston assembly reciprocates, there is load reversal from one piston skirt to the other around the top and bottom of the stroke. When this load reversal occurs, the fact that the inertial mass of the piston is located above the wrist pin tends invariably to rock the piston in a direction producing divergence of the cylindrical portion of the skirt with respect to the oil film. This divergent geometry will not maintain an oil film. The barrel-shaped sections are designed to catch this rock. The barrel-shaped surfaces interact with the cylinder wall in squeeze film mode and also engage the oil film as convergent bearing surfaces. The barrel surface-cylinder wall forces generated in this way tip the piston skirt into the proper convergent mode for load bearing as the piston reciprocates. The geometry of the radius of curvature of the barrel-shaped sections is very much enlarged for clarity in FIG. 4.

In production, it is desirable to have the radius of the barreled section very large, but not so large as to be unable to accommodate piston rock when the piston is coldest and, therefore, has the most clearance in the cylinder. For a four (4) inch piston the radius of the barrel section may, for example, be 20 inches or more. Flexible distortions of the piston skirt do not interfere with the function of the barrel sections. The amount of crown height distance h on the barrel-shaped portions of the skirt is quite small. For example, for a 4-inch piston built similarily to FIG. 3 with respect to axial dimensions, the maximum crown height of the barrel-shaped section is only 0.006 inches (0.15 mm).

Figure 5A:
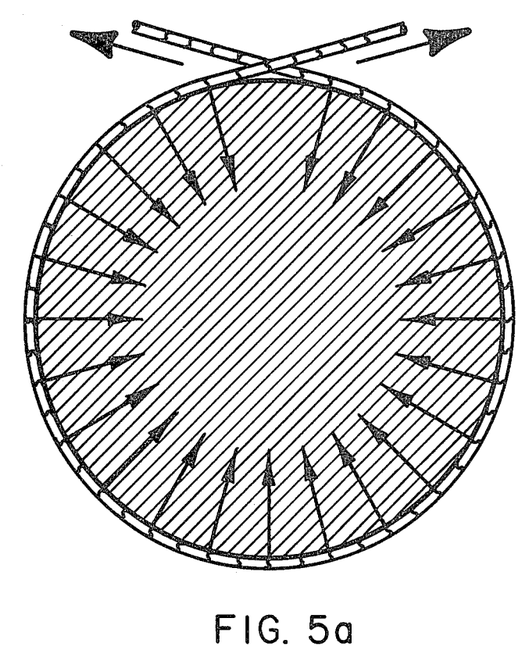
FIG. 5a illustrates a rope or flexible cable in tension around a cylinder, to illustrate that such a rope or cable, if the rope is very flexible and if friction between rope and cylinder can be ignored, will produce a uniform inward radial force around the circumference of the cylinder.

FIG. 5a illustrates a rope of flexible cable in tension around a cylinder, to illustrate that such a rope or cable, if the cable or rope is very flexible and if friction between rope and cylinder can be ignored, will produce a uniform inward radial force around the circumference of the cylinder. The force will be perpendicular to the surface at all points, and will vary inversely with the local radius of curvature of the shape that the rope is tied around if the "cylindrical" shape is not perfect. The ability of the piston rings and piston skirts to conform to the distortions of the cylinder wall and to the tiny geometrical variations required to maximize oil film pressure forces is analogous to that of the case of a rope around a cylinder.

The structural equations for tension and compression are exactly the same so long as buckling does not occur. In service, the piston rings and piston skirts are in circumferential compression, and both the rings and the skirts are very flexible with respect to the deformations required of them. The relationship of either piston skirt or ring to the cylinder wall constrains buckling. In consequence the piston skirts and the piston rings conform to very fine scales so as to produce outward forces perpendicular to the local cylinder surface and inversely proportional to the surface radius of curvature. Since the local radius of curvature of the cylinder wall varies very little, there is close approximation to uniform outward radial forces produced by either the piston skirt or the rings under load.

Figure 5B:
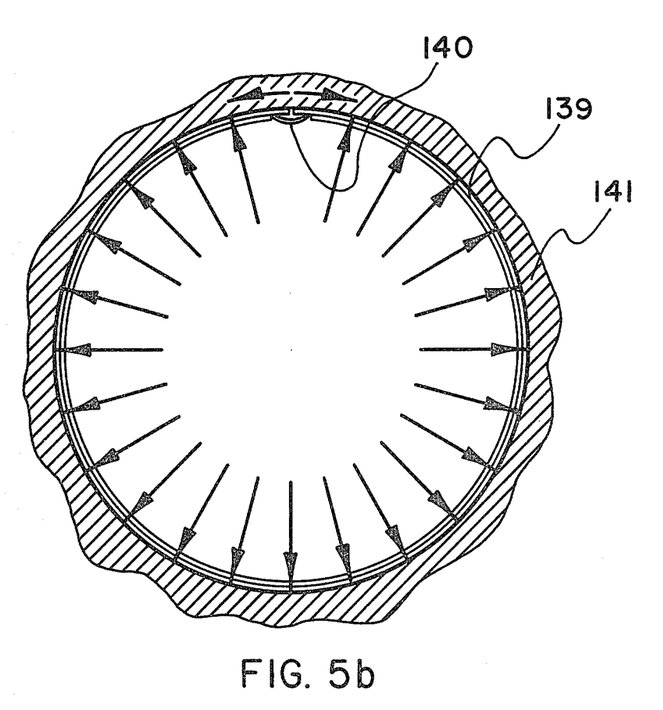
FIG. 5b is a schematic showing how a flexible ring in circumferential compression will conform to small cylinder distortions in such a fashion as to establish uniform radial forces with local radial force balances about the cylinder circumference.

FIG. 5b is a schematic showing how a flexible ring in circumferential compression will conform to small cylinder wall deformations so as to establish local radial force balances about the ring circumference. This schematic illustrates the reason that the piston skirts and rings can conform elastically to produce the extremely fine-scale geometrical conformance required to maximize full-film oil thicknesses and produce oil control from the ring pack. The piston ring 139 is shaped and sized so as to have a much smaller bending moment of inertia than is conventional for rings. Ring 139 is loaded at the end gap with an end-gap separating spring 140 which serves to put ring 139 in circumferential compression. If ring 139 is contained in a perfectly shaped cylinder wall, and if friction between ring 139 and cylinder wall 141 (and between the ring and the piston groove) is negligible there will be a uniform radial outward force between the ring crown and cylinder wall 141. If, on the other hand, cylinder wall 141 is not perfectly cylindrical, and ring 139 is initially round, there will be sections with excessive radial force and other unsupported sections with no radial force. It has been demonstrated by calculation that the ring will deform with respect to the distortions which occur on the cylinder wall or with respect to nonuniform forces produced by oil films so as to very closely (within plus or minus 5%) produce uniform outward radial forces around the circumference of the ring. The ring is flexible enough to accommodate cylinder out-of-round, (which may amount to about $10^{-3}$ of the cylinder bore diameter) and can accommodate variations in bore out-of-round as the piston reciprocates axially. If the ring is floating in the grooves so that the rings are free to move radially, the rings can make extremely fine and rapid radial adjustments to produce local force balances. The fully free ring of the present invention can move to balance local oil film forces between the ring crown and the cylinder all around the ring circumference. This fine scale conformance is required for oil control and full film lubrication of the rings.

The fluid mechanics of the ring sliding against the cylinder with an oil film is such that change of a few microinches in clearance between ring crown and cylinder may produce a significant variation in oil film forces on the ring crown. The flexible ring is designed to very rapidly locally equilibrate these forces, increasing film thicknesses (and reducing film pressures) when oil film pressures are excessive, and conversely thinning oil film thicknesses (and increasing pressures) to achieve balance if the oil film pressure is too small. The geometrical accommodation between the ring crown and the cylinder wall to produce proper equilibration of the oil film physics requires extreme precision of the elastic characteristics of the ring, since oil film thicknesses between ring crown and cylinder wall may be as small as tens of microinches. If the ring is free on an oil film in the grooves so that it can move radially with zero static friction this extreme precision of adjustment can be achieved, both on the average and at all points.

Figure 6:
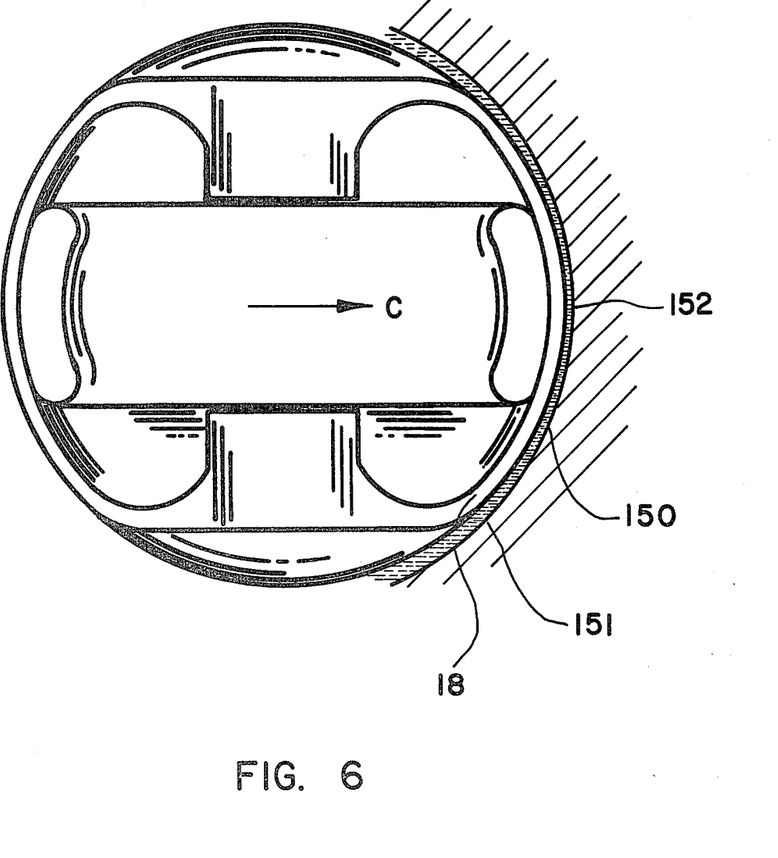
FIG. 6 is a schematic illustrating more particularly the deflection characteristics of the piston skirt which maximize squeeze film and hydrodynamic lubrication effects to minimize friction.

FIG. 6 is a schematic illustrating more particularly the radial conformity of the piston skirt to the cylinder wall to maximize squeeze film and hydrodynamic lubrication effects to minimize friction. The piston skirts do not extend around the full circumference, but have circumferential extents of 90° and less, and are constrained by rigid supports connected to the wrist pin boss. In the illustration, the piston skirt 18 has a smaller radius of curvature than cylinder wall 150 and is loaded by a force in direction C from the connecting rod (not shown). Between the piston skirt 18 and the cylinder wall 150 is a full film of oil 151. As the piston skirt approaches the cylinder-wall, squeeze-film effects will produce maximum pressure at 152, and this pressure will tend to deform the piston skirt away from the maximum oil film force. The geometry shown is exaggerated, since the difference in radius of curvature between skirt and cylinder wall is at most a few thousandths of an inch (of the order of 0.025–0.1 mm), but the skirt will conform radially so that the force balance between oil film pressure and outward radial force from the piston skirt is nearly equalized all around the skirt. This geometrical conformance of the piston skirt will tend to maximize oil film thicknesses and tend to minimize friction. The skirt will, therefore, operate with lower friction than current art piston skirts. With respect to FIG. 6, it is worth referring again to FIGS. 1 and 3, noting the slot section 101, which causes the piston skirt to be elastically free from the piston crown around the circumferential section B—B. The skirt section around arc B—B can therefore conform to maximize squeeze film stability and effectiveness.

Figure 7:
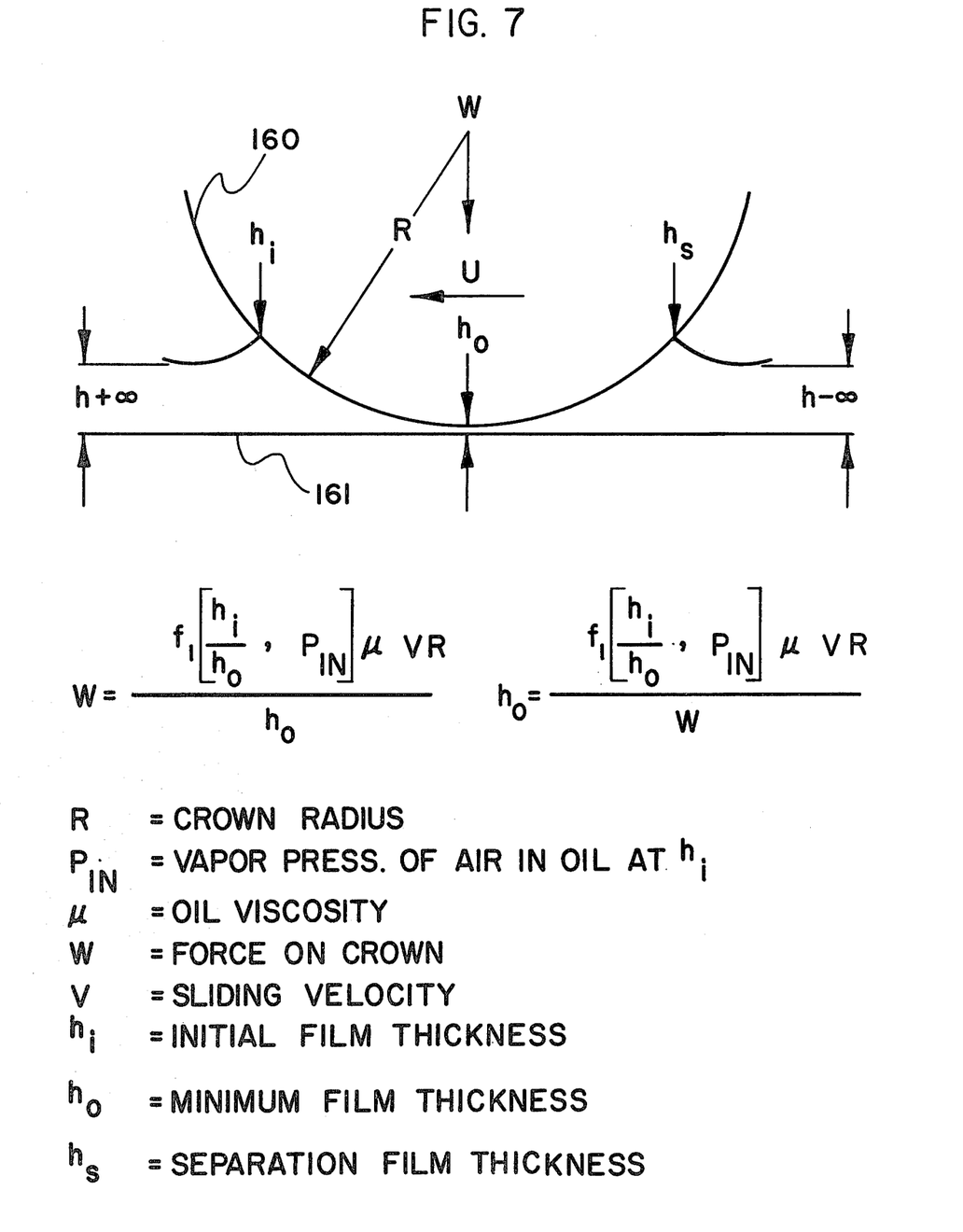
FIG. 7 shows a schematic (with the vertical dimensions and film thicknesses exaggerated for clarity) of a cylinder sliding on a flat plate to illustrate the fluid mechanics relevant to the fully hydrodynamic elastically compliant piston ring crown sliding on the cylinder wall.

FIG. 7 shows a schematic of a cylinder sliding on a flat plate to illustrate the fluid mechanics relevant to the fully hydrodynamic elastically compliant piston ring crown sliding on the cylinder wall. The film thicknesses between the ring crown and cylinder wall are so thin that the cylinder wall curvature has a negligible effect on the fluid mechanics between ring crown and cylinder wall. This cylinder 160 with radius R slides on flat plate 161 and moves to the left at a velocity U. An oil film thickness $h_{+\infty}$ covers the plate well ahead of the cylinder. Oil accumulated by the sliding cylinder forms maximum upstream film thickness $h_i$. The hydrodynamic fluid motions between cylinder and plate generate pressures as the film converges from $h_i$ to minimum film thickness $h_o$. After the film moves past minimum film thickness $h_o$ there is a divergence between cylinder and flat plate. The oil film slows down and separates in this divergent section. The film separates from the cylinder at a thickness $h_s$ and lays down a film of thickness $h_{-\infty}$ behind the sliding cylinder. A sense of the exaggeration of the vertical dimensions under the speeds and loads relevant to the piston ring case is important. Minimum film thickness $h_o$ near top and bottom dead center may be of the order of 10 microinches.

The convergence of oil between $h_i$ and $h_o$ generates a pressure (there is also some pressure contribution in the declining pressure zone of the divergent section) producing a film pressure force which is balanced by load W on the cylinder. If the load W is constant or determined by physics other than the fluid film physics (in the case of the piston rings the combination of spring and gas actuating forces) the cylindrical ring crown will adjust the distance $h_o$ until a force balance is established between load W and the countervailing oil film pressure force. For this to happen rapidly and at all localities around the circumference of a piston ring requires a flexible piston ring design fully floating in the grooves in the manner currently disclosed.

The relation of oil film pressure force to minimum film thickness $h_o$ and to film thicknesses $h_i$ and $h_{+\infty}$ is relevant. If $h_i$ is more than about 5 times $h_o$, further increases in $h_i$ have only small effects on the film pressure developed. Under these "flooded" conditions the pressure developed in the oil film is almost exactly proportional to $U/h_o$. Referring again to FIG. 1, oil from the reservoir groove 101 assures that oil control ring 14 will be flooded with respect to downstrokes. The radius of curvature and spring load of oil control ring 14 are arranged so that the thickness of oil film $h_{-\infty}$ laid down by the oil control ring always operates to run the compression rings 10 and 12 in an unflooded condition, where the oil film is fully hydrodynamic but "starved." It is necessary that the oil layers on which rings 10 and 12 reciprocate be sufficiently thin that they are "starved" so that these rings have a negligible tendency to pump oil to the top of the cylinder wall, but it also necessary to assure that there is a full film of lubricant with no metal-to-metal contact between the ring crowns of rings 10 and 12 and the cylinder wall. For this to be possible, it is necessary that all three rings float freely in the ring grooves so that exact elastic deformations required to establish local force balances can occur in an unconstrained and accurate fashion entirely around the circumference of each ring. When this is done on a cylinder wall having extremely smooth surfaces so that the high spots of the surfaces do not interrupt the oil film, it is possible to have a fully hydrodynamic piston ring pack which does not pump oil.

Figure 8:
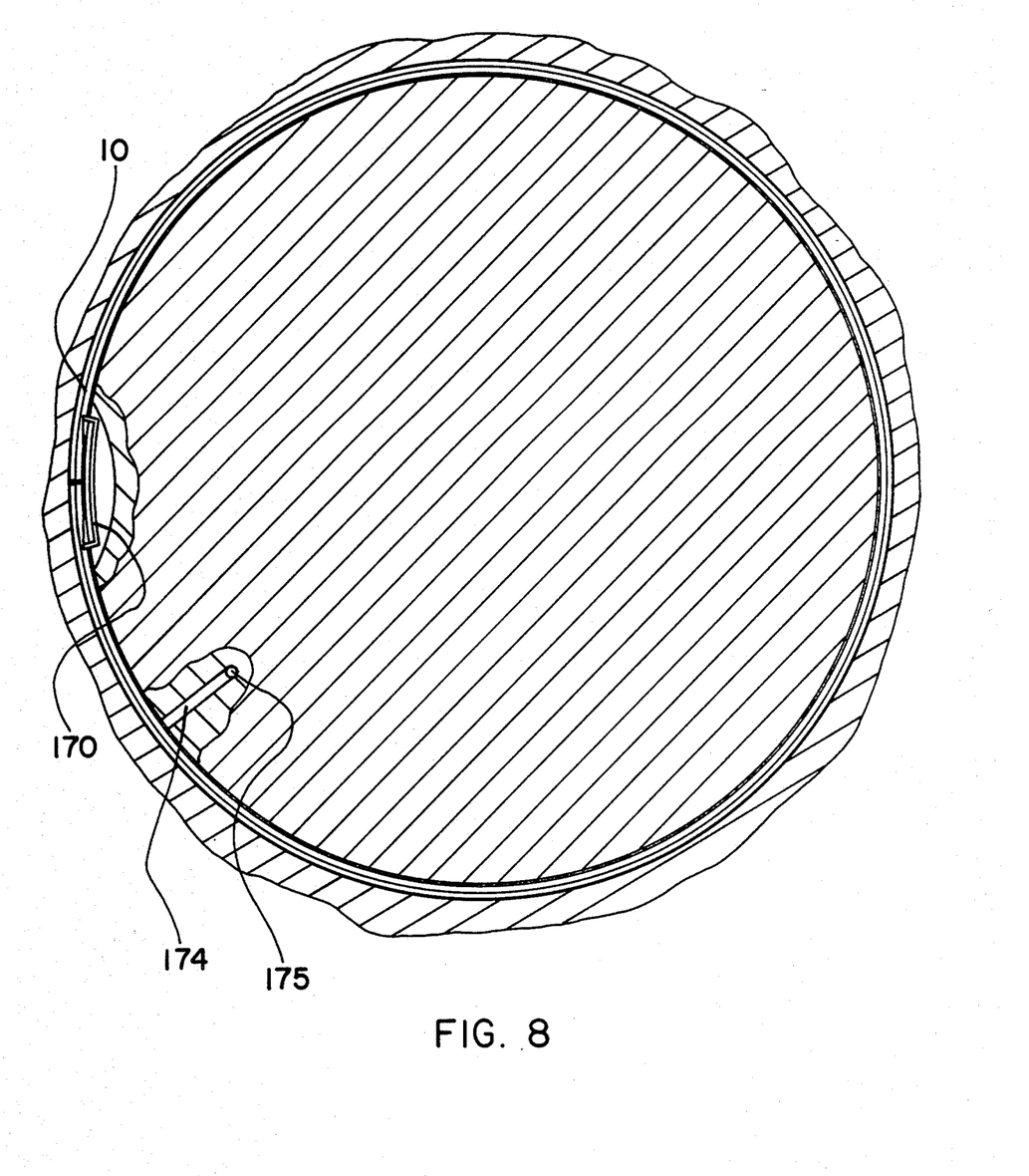
FIG. 8 shows a sectional view on A—A of FIG. 1 showing the flexible ring with end-gap loading by means of an end gap separating spring in line with the wrist pin.

FIG. 8 shows a sectional view on A—A of FIG. 1 showing the flexible ring 10 with end-gap loading via a spring 170 in line with the wrist pin (not shown). The second ring, ring 12, would have its end-gap and spring also in line with the wrist pin, but rotated 180°, and the oil control ring, ring 14, would have its end-gap spring in line with the end-gap of ring 10 shown in FIG. 8. Since there is a small supply of oil to the ring grooves from the wrist pin, in the manner illustrated in FIG. 2, the ring grooves will float freely in squeeze film mode as the piston operates. This squeeze film situation occurs because there will be load reversal with respect to the grooves of the piston ring on every full cycle of the engine operation. This full load reversal in the presence of a supply of oil is a sufficient condition for squeeze film fluid mechanics and maintenance of the full oil film required to eliminate static friction and sticking between rings and grooves. FIG. 8 also shows an oil drain passage 174 and a pressure driven oil drain hole 175 which connects to the crankcase pressure at the bottom of the piston. This drain arrangement is necessary to keep oil feed passage 27, shown in FIG. 2, from overflooding the piston grooves. A similar drain arrangement rotated 180° is provided for the piston groove which mounts ring 12 (not shown).

Figure 9:
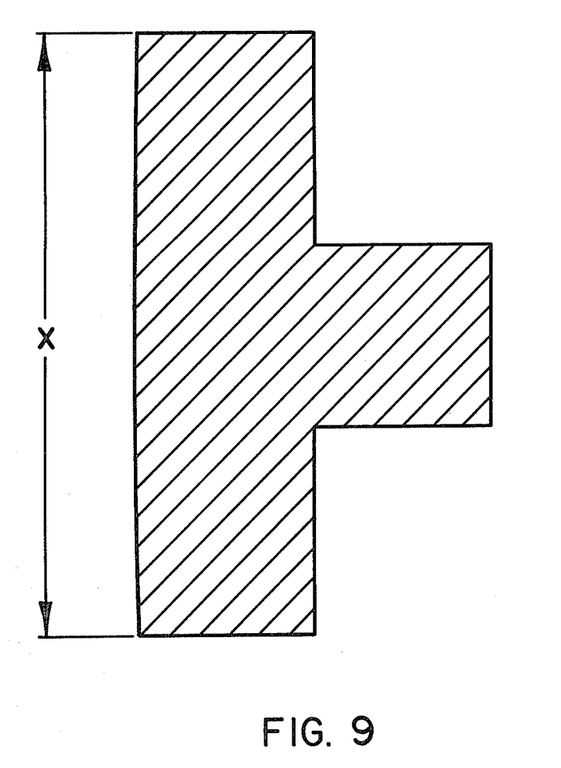
FIG. 9 shows an enlarged cross sectional view of the ring of FIG. 8.

FIG. 9 shows an enlarged cross sectional view of the ring of FIG. 8. It is required that the ring moment of inertia in bending be much less than that of typical rings, for example a distance X equal to 0.1 inches (2.54 mm) with the other dimensions roughly proportional to those in the drawing. The more flexible the ring, the more readily the ring can conform to cylinder wall distortions when it is loaded in circumferential compression in the manner illustrated in FIG. 5b.

Figure 10:
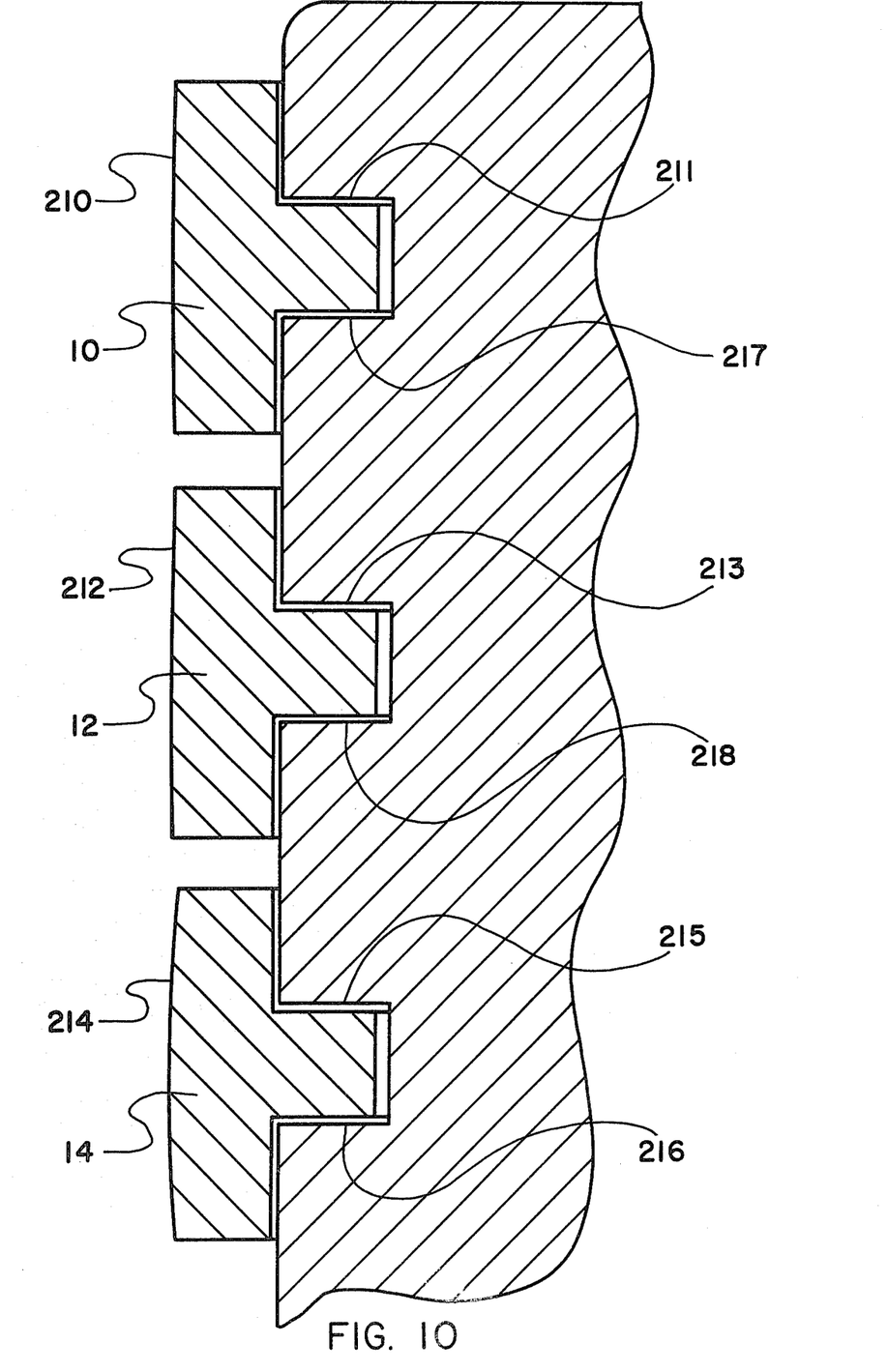
FIG. 10 is an enlarged cross sectional view of the three ring pack shown in FIG. 1 illustrating more particularly the differences between the rings.

FIG. 10 is an enlarged cross sectional view of the three-ring pack shown in FIG. 1 illustrating more particularly the differences between the rings. In the drawing, rings 10 and 12 have a large (for example 2 inches) cylindrical crown radius (surfaces 210 and 212) and oil ring 14 has a cylindrical crown radius (surface 214) that is less than ¼ the crown radius of rings 10 and 12. Ring 14 functions to ration oil to rings 10 and 12 for oil control, but must assure that a sufficiency of oil is supplied to assure that rings 10 and 12 function in the fully hydrodynamic but starved regime during intake and exhaust strokes for low friction and negligible wear. It should be emphasized again that both the ring crown surfaces and the cylinder wall surface should be made as smooth as possible, preferably to an RMS value of a few microinches, so that the very thin oil films between ring crown and cylinder wall are not broken through by peaks and valleys in the surfaces. Even with great care film breakdown between ring crowns and the cylinder walls may occur. This may happen particularly near top dead center piston position where gas actuating forces increase ring crown loads and where piston velocity vanishes on every cycle.

It may therefore be worthwhile to face the ring crown surfaces with a thin layer of tungsten carbide or similar very hard surface which is capable of being ground to the required smoothness. If this is done, it is likely that the extreme pressure additives in engine oils will act to smooth out any contacting peaks of the cylinder wall surface with negligible wear of the ring crown itself.

The fully hydrodynamic and flexible rings are necessary to permit the cylinder wall below the ring pack to be flooded. This flooding is required to obtain the very low friction that is available with the flexible pivoted pad slider piston skirts. It is worthwhile to set out the necessary conditions for the function of the flexible fully hydrodynamic rings, and to describe their function for oil control.

The ring crowns must be cylindrical so that the geometry of the oil film between the cylinder wall and the crowns does not vary as the piston rocks. The finish on the ring crowns and cylinder walls must be as smooth as possible, since even the best oil films will be very thin. The rings must conform elastically to very fine scales to produce local and dynamic equilibration of the ring crown load and oil film forces all around the circumference of the ring. For this to be possible, it is necessary for a full film of oil to be established between the ring groove surfaces (211, 217, 213, 218, 215, 216) and the engaging surfaces of the rings to eliminate sticking of the rings of the grooves.

Even with the best geometrical and elastic design, it is important to maximize the oil viscosity on which the rings operate, since the very low viscosities characteristic of very hot engine oil are not sufficient to maintain oil films. In consequence, the heat transfer load of the rings must be held as low as possible so that oil film viscosity can be held within a tolerable range. The heat pipe equipped piston is capable of doing this, and the heat pipe has the additional advantage of maintaining piston shape. The piston skirts can therefore be optimized as bearings.

Another viscosity requirement concerns the issue of gasoline liquid sprayed on the cylinder walls. The viscosity of gasoline is unacceptably low for full film formation under the loads in which the piston rings must operate. It is therefore necessary to provide an arrangement which eliminates the supply of liquid phase gasoline to the cylinder walls, even under cold start conditions. Clearly, this is possible with propane or natural gas engines, and is also possible with engines equipped with the mixing vortex owned by Automotive Engine Associates and disclosed in U.S. Pat. No. 4,318,386.

It is important that the elastic characteristics of the full film ring be arranged to produce instantaneous conformance of the ring crown with respect to the oil film and with respect to the cylinder wall distortions which must be anticipated in service. The combination of a low bending moment of inertia ring in end-gap loading with constraints on buckling is sufficient to accomplish this.

With exact conformance of the ring crown to local cylinder wall surface distortions and local oil film forces, it is possible to apply analysis to design piston rings with low friction, essentially zero wear and good oil control. Referring again to FIG. 7, a quick review of the basic physics of cylinder on flat plate fluid mechanics relevent to the ring is worthwhile. The oil film thickness and load will be related to both geometry and the cavitation conditions in the ring.

In the range of oil film thicknesses relevant to the ring, oil flow past the ring is equal to $h_oU$ to within plus or minus 5%. For a set ratio $h_i/h_o$ and a set $P_{in}$, $h_o$ is proportional to R. This means that if oil control ring 14 and compression rings 10 and 12 were to operate with the same loads W, the minimum film thickness of oil control ring 14 would be much smaller than those of rings 10 and 12. The small radius of curvature oil control ring assures that rings 10 and 12 operate in a fully hydrodynamic, but somewhat starved condition most of the time. This is required for oil control.

The equilibrium film thickness and load W of an oil film is a function not only of geometry, but also of the pressures above and below the ring crown. The faster the oil film cavitates in the divergent part of the cylinder-flat plate geometry (the faster air bubbles come out of solution eliminating the negative pressure loop in the divergent section), the higher the load bearing capacity of the ring will be for a set minimum oil film thickness $h_o$. The oil film on the cylinder wall rapidly reaches partial pressure equilibrium with the air or products of combustion which surround the oil film. This means that the partial pressure of air or other gases above the compression ring is consistently greater than the partial pressure of gas in the oil film below the compression ring. For this reason the oil film cavitates more rapidly on upstrokes, where the oil moves from a high ambient pressure to a low one, than on downstrokes, where the oil film moves from a low ambient pressure to a high one. This asymmetry in cavitation conditions between upstrokes and downstrokes produces an equilibrium film thickness on upstrokes that is thicker than the equilibrium film thickness for the same ring loads on downstrokes. This asymmetry tends to keep oil from being swept to the top of the cylinder wall, and is therefore useful for oil control.

In addition to the cavitation effect, the starvation of the rings 10 and 12 during the intake and exhaust stroke makes them "skate" in a manner where there is no net pumping of oil during the intake and exhaust strokes. Professor Harold Elrod of Columbia University has done a calculation illustrating that for sufficiently starved cylinders on flat plates, there is no net pumping of oil with motion of the rings.

It has been shown how to produce a piston assembly utilizing elasticity and full film bearing physics, with internal cooling via a heat pipe to produce a reciprocating piston assembly which operates with radically lower friction than that of prior art piston and piston ring assemblies.

It is claimed:

1. In a machine having a piston which reciprocates in a cylinder and mounts a wrist pin extending perpendicularly to the central axis of the cylinder, a connecting rod is operatively connected to the wrist pin and with its other end connected to an engine crankshaft by suitable bearing means, said piston having a top portion mounting a means for sealing the piston with respect to the cylinder wall as it reciprocates therein, a piston top with a boss structure depending therefrom, said boss structure having a transverse hole adapted to mount the wrist pin, a skirt assembly positioned below the top portion and comprising two arcuate thrust bearing skirts supported by the aforesaid boss structure, each arcuate thrust bearing skirt comprising, a cylindrical segment flexible in bending with respect to cylinder wall distortion and constrained against circumferential compression forces at its vertical edges by rigid connection to the wrist pin boss, the top of each segment being mechanically spaced from the piston top so that said piston top does not constrain deformation of said segments, the radius of the outer cylindrical surface of each segment being slightly smaller than that of the cylinder wall in which the piston reciprocates, whereby the forces transmitted from the wrist pin to the cylinder wall are borne by the cylindrical segment thrust bearing skirts in circumferential compression so that said skirts conform to local variation in cylinder distortion and local oil film pressures to provide a relatively even radial force on the cylinder wall for the area covered by the thrust bearing skirt faces to maximize the effectiveness of said skirts as full film bearings acting on the cylinder wall, the cylindrical thrust bearing skirts being vertically centered with respect to the central axis of the wrist pin so that the skirts act as pivoted pad bearings pivoting about said wrist pin center axis as the piston reciprocates, each cylindrical thrust bearing skirt having a mid portion with its outer surface cylindrical and centered about the wrist pin center axis, the remaining portions above and below each mid portion being slightly barrel shaped radially inwardly to function as sled runners with respect to said cylindrical mid portion surfaces whereby said barrel spaced portions catch piston rock and assure proper convergent pivoting of said cylindrical skirts with respect to the cylinder wall as the piston reciprocates, wherein said piston is adapted with flexible fully hydrodynamic piston rings, wherein lubrication means are provided so that said arcuate thrust bearing skirts are fully flooded with oil as they interact with the cylinder wall, and wherein heat pipe cooling means are provided to maintain said arcuate skirts in a nearly isothermal condition at a temperature close to the temperature of said piston crowns.

2. In a machine having a piston which reciprocates in a cylinder and mounts a wrist pin extending perpendicularly to the central axis of the cylinder, a connecting rod is operatively connected to the wrist pin and with its other end connected to an engine crankshaft by suitable bearing means, said piston having a top portion mounting a means for sealing the piston with respect to the cylinder wall as it reciprocates therein, where the piston has a piston skirt assembly having opposed thrust surfaces extending downwardly from the piston top for engaging the wall of the cylinder in the manner of hydrodynamic bearings to support side thrust forces and to limit the angle of rocking of the piston within the cylinder, the piston being provided with a first peripheral groove in its upper portion, said groove having parallel upper and lower walls terminating in a back wall, a first sealing member having a "T" shaped cross section with the base of the T riding in the space between the upper and lower groove walls on a film of lubricant for free radial movement therein, said first sealing member being flexible with respect to cylinder wall deformations and having spring means operatively cooperating with the first sealing member whereby said first sealing member will conform on a scale relevant to the fluid mechanics of the lubricant film between the sealing member and the cylinder wall to any cylinder wall distortion which occurs in piston engine practice, that portion of the first sealing member engaging the lubricant film on the cylinder wall being curved to form a barrel-like crown surface along an arc roughly parallel to the cylinder axis having a radius of curvature large enough so said surface acts as a good hydrodynamic bearing in interaction with the lubricant film on the cylinder wall, said barrel-like crown surface having a small enough radius of curvature so that said crown contacts the thin lubricant film covering the cylinder wall over the full range of rocking of said piston in the cylinder, the piston being provided with a second peripheral groove in its upper portion, said groove having parallel upper and lower walls terminating in a back wall, a second sealing member having a "T" shaped cross section with the base of the T riding in the space between the upper and lower groove walls on a film of lubricant for free radial movement therein, said second sealing member being flexible with respect to cylinder wall deformations and having spring means operatively cooperating with the second sealing member whereby said second sealing member will conform on a scale relevant to the fluid mechanics of the lubricant film between the second sealing member and the cylinder wall to any cylinder wall distortion which occurs in piston engine practice, that portion of the second sealing member engaging the lubricant film on the cylinder wall being curved to form a barrel-like crown along can arc roughly parallel to the cylinder axis with said crown radius of curvature smaller than that of the first sealing member to form a barrel-like surface acting as a good hydrodynamic bearing in interaction with the lubricant film on the cylinder wall, wherein all of the surfaces of said piston-seal assembly which slide against the lubricant film on the cylinder wall act in combination to leave a layer of lubricant on said cylinder wall sufficiently thick so that the sliding surface of said sealing members function in interaction with the cylinder wall as hydrodynamic bearings in the fully flooded or starved full film regime with substantially no cycle time for said sealing member surfaces in the boundary lubrication regime, a said piston having an upper portion called a piston top with a boss structure depending therefrom, said boss structure having a transverse hole adapted to mount the wrist pin, a skirt assembly positioned below the top portion and comprising two arcuate thrust bearing skirts supported by the aforesaid boss structure, each arcuate thrust bearing skirt comprising, a cylindrical segment flexible in bending with respect to cylinder wall distortion and constrained against circumferential compression forces at its vertical edges by rigid connection to the wrist pin boss, the top of each segment being mechanically spaced from the piston top so that said piston top does not constrain deformation of said segments, the radius of the outer cylindrical surface of each segment being slightly smaller than that of the cylinder wall in which the piston reciprocates, whereby the forces transmitted from the wrist pin to the cylinder wall are borne by the cylindrical segment thrust bearing skirts in circumferential compression so that said skirts conform to local variation in cylinder distortion and local oil film pressures to provide a relatively even radial force on the cylinder wall for the area covered by the thrust bearing skirt faces to maximize the effectiveness of said skirts as full film bearings acting on the cylinder wall, the cylindrical thrust bearing skirts being vertically centered with respect to the central axis of the wrist pin so that the skirts act as pivoted pad bearings pivoting about said wrist pin center axis as the piston reciprocates, each cylindrical thrust bearing skirt having a mid portion with its outer surface cylindrical and centered about the wrist pin center axis, the remaining portions above and below each mid portion being slightly barrel shaped radially inwardly to function as sled runners with respect to said cylindrical mid portion surfaces whereby said barrel shaped portions catch piston rock and assure proper convergent pivoting of said cylindrical skirts with respect to the cylinder wall as the piston reciprocates, and heat pipe means for rapid heat transfer between said piston top and said thrust bearing skirts, which heat pipe means maintain said arcuate skirts in a nearly isothermal condition at a temperature close to the temperature of said piston top.

3. The invention as set forth in claim 2 and wherein each sealing member is a ring and, each ring has a single cut completely through its cross section providing an end gap, each ring has cross sectional dimensions small enough so that the ring is flexible and still sufficiently strong that it will withstand the pressure forces to which it is subjected in its functioning environment, and being adapted to mount a spring which spans the end gap to expand the end gap whereby the ring is placed in circumferential compression so that the elastic deformations of the ring-spring system interact whereby the ring crown surface will conform on a scale relevant to the fluid mechanics of the lubricant film between said crown and the cylinder wall and conform to any cylinder wall distortion which occurs in internal combustion engine practice.

4. The invention as set forth in claim 3 and wherein each ring is freely supported in its respective groove and elastically arranged so that its ring crown rapidly and continuously moves to establish local force equilibria between the ring crown and the oil film on the cylinder wall throughout the circumference of said cylinder wall, the lowermost ring having a radius of crown curvature less than that of the ring above it, means in the piston to supply oil to the cylinder wall below the lower ring whereby said lower ring operates in the flooded lubrication regime on downstrokes whereby the oil film on the cylinder wall following down travel of the lowermost ring is a thin continuous film which constitutes the proper oil supply so that the upper ring slides on said oil film in the fully hydrodynamic but partly starved lubrication regime through the intake and exhaust strokes.

5. The invention as set forth in claim 4 and wherein the oil film on the cylinder wall following down travel of the lowermost ring is thin enough so that there is no net pumping of oil to the top of the cylinder wall as the piston reciprocates.

6. The invention as set forth in claim 2 and wherein in each sealing member is a ring whose crown surface is highest at its center with respect to the cylinder axis and wherein the base of the T riding in its respective groove is likewise centered and has parallel surfaces which together with the coacting groove walls have smooth and flat surfaces.

7. The invention as set forth in claim 6 and wherein means are provided to deliver sufficient oil into the respective grooves so that each ring's base riding in its respective groove interacts to form a squeeze film between respective base and groove surfaces so that each ring is free to conform radially to cylinder wall distortions and varying oil film-crown forces.

8. The invention as set forth in claim 2 and wherein there are three sealing members and cooperating piston grooves and wherein the top two sealing members are identical in structure.

9. The invention as set forth in claim 2 and wherein the surface finish of the cylinder wall and the coacting surface finish of the sealing member's crowns have surface character heights small enough so that the lubricant film breakdown between said crown surfaces and said cylinder wall will not occur under flooded lubrication conditions for said second sealing member during piston downstrokes of any instantaneous operating condition which occurs during operation of the piston.

10. The invention as set forth in claim 2 and wherein the piston is provided with a groove extending completely around the periphery of the piston immediately below the lowermost piston sealing member groove to serve as a reciprocating oil reservoir to assure adequate oil supply to said second sealing member during piston downstrokes.

11. In a machine having a piston which reciprocates in a cylinder and mounts a wrist pin extending perpendicularly to the central axis of the cylinder, a connecting rod is operatively connected to the wrist pin and with its other end connected to an engine crankshaft by suitable bearing means, said piston having a top portion mounting a means for sealing the piston with respect to the cylinder wall as it reciprocates therein, where the piston has a piston skirt assembly having opposed thrust surfaces extending downwardly from the piston top for engaging the wall of the cylinder in the manner of hydrodynamic bearings to support side thrust forces and to limit the angle of rocking of the piston within the cylinder, the piston being provided with a first peripheral groove in its upper portion, said groove having parallel upper and lower walls terminating in a back wall, a first sealing member having a "T" shaped cross section with the base of the T riding in the space between the upper and lower groove walls on a film of lubricant for free radial movement therein, said first sealing member being flexible with respect to cylinder wall deformations and having spring means operatively cooperating with the first sealing member whereby said first sealing member will conform on a scale relevant to the fluid mechanics of the lubricant film between the sealing member and the cylinder wall distortion which occurs in piston engine practice, that portion of the first sealing member engaging the lubricant film on the cylinder wall being curved to form a barrel-like crown surface along an arc relatively parallel to the cylinder axis having a radius of curvature large enough so said surface acts as a good hydrodynamic bearing in interaction with the lubricant film on the cylinder wall, said barrel-like crown surface having a small enough radius of curvature so that said crown contacts the thin lubricant film covering the cylinder wall over the full range of rocking of said piston in the cylinder, the piston being provided with a second peripheral groove in its upper portion, said groove having parallel upper and lower walls terminating in a back wall, a second sealing member having a "T" shaped cross section with the base of the T riding in the space between the upper and lower groove walls on a film of lubricant for free radial movement therein, said second sealing member being flexible with respect to cylinder wall deformations and having spring means operatively cooperating with the second sealing member whereby said second sealing member will conform on a scale relevant to the fluid mechanics of the lubricant film between the second sealing member and the cylinder wall to any cylinder wall distortion which occurs in piston engine practice, that portion of the second sealing member engaging the lubricant film on the cylinder wall being curved to form a barrel-like crown along an arc roughly parallel to the cylinder axis with said crown radius of curvature smaller than that of the first sealing member to form a barrel-like surface acting as a good hydrodynamic bearing in interaction with the lubricant film on the cylinder wall, wherein all of the surfaces of said piston-seal assembly which slide against the lubricant film on the cylinder wall act in combination to leave a layer of lubricant on said cylinder wall sufficiently thick so that the sliding surface of said sealing members function in interaction with the cylinder wall as hydrodynamic bearings in the fully flooded or starved full film regime with substantially no cycle time for said sealing member surfaces in the boundary lubrication regime.

12. A piston particularly adapted for use in an internal combustion engine having the usual cylinder for reciprocally carrying same, said piston comprising, a piston top with a boss structure depending therefrom, said boss structure having a transverse hole adapted to mount a wrist pin, a skirt assembly positioned below the top portion and comprising two arcuate thrust bearing skirts supported by the aforesaid boss structure, each arcuate thrust bearing skirt comprising, a cylindrical segment flexible in bending with respect to cylinder wall distortion and constrained against circumferential compression forces at its vertical edges by rigid connection to the wrist pin boss, the top of each segment being mechanically spaced from the piston top so that said piston top does not constrain deformation of said segments, the radius of the outer cylindrical surface of each segment being slightly smaller than that of the cylinder wall in which the piston reciprocates, whereby the forces transmitted from the wrist pin to the cylinder wall are borne by the cylindrical segment thrust bearing skirts in circumferential compression so that said skirts conform to local variation in cylinder distortion and local oil film pressures to provide a relatively even radial force on the cylinder wall for the area covered by the thrust bearing skirt faces to maximize the effectiveness of said skirts as full film bearings acting on the cylinder wall, the cylindrical thrust bearing skirts being vertically centered with respect to the central axis of the wrist pin so that the skirts act as pivoted pad bearings pivoting about said wrist pin center axis as the piston reciprocates, each cylindrical thrust bearing skirt having a mid portion with its outer surface cylindrical and centered about the wrist pin center axis, the remaining portions above and below each mid portion being slightly barrel shaped radially inwardly to function as sled runners with respect to said cylindrical mid portion surfaces whereby said barrel shaped portions catch piston rock and assure proper convergent pivoting of said cylindrical skirts with respect to the cylinder wall as the piston reciprocates.

13. The invention as set forth in claim 12 and wherein means are provided to transfer heat from the piston top to the piston skirt assembly so that the entire piston structure is nearly isothermal.

14. The invention as set forth in claim 13 and wherein the heat transfer means comprises an evaporation-condensation heat pipe structure bonded to the piston top and skirt assembly.

15. The invention as set forth in claim 14, and wherein the heat pipe structure is bonded to the piston top and skirt assembly by means of a high temperature and high conductance elastomer.

* * * * *